United States Patent
Betz et al.

(10) Patent No.: US 7,673,713 B2
(45) Date of Patent: Mar. 9, 2010

(54) MULTI-PURPOSE MOBILE POWER GENERATING MACHINE

(75) Inventors: Michael D. Betz, Knoxville, IL (US); Michael A. Caruthers, Washington, IL (US); Stephen C. Garnett, Princeville, IL (US); Richard F. Shults, Tremont, IL (US); Bruce E. Unger, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 546 days.

(21) Appl. No.: 11/586,593

(22) Filed: Oct. 26, 2006

(65) Prior Publication Data
US 2008/0099257 A1 May 1, 2008

(51) Int. Cl.
*B60K 1/00* (2006.01)
*B60K 6/20* (2007.01)
*B60K 6/42* (2007.10)
*B60K 6/46* (2007.10)
*B60W 20/00* (2006.01)

(52) U.S. Cl. .............. 180/65.21; 180/65.1; 180/65.22; 180/65.245; 180/65.27; 180/65.31

(58) Field of Classification Search .......... 180/65.1, 180/65.21, 65.22, 65.245, 65.27, 65.31
See application file for complete search history.

(56) References Cited

U.S. PATENT DOCUMENTS

| | | |
|---|---|---|
| 3,860,081 A | 1/1975 | Moll et al. |
| 4,113,045 A | 9/1978 | Downing, Jr. |
| 4,196,785 A | 4/1980 | Downing, Jr. |
| 4,661,714 A | 4/1987 | Satterthwaite et al. |
| 5,081,365 A | 1/1992 | Field et al. |
| 5,199,912 A | 4/1993 | Dade et al. |
| 5,212,431 A | 5/1993 | Origuchi et al. |
| 5,300,819 A | 4/1994 | Lee |
| 5,563,451 A | 10/1996 | Furukawa |
| 5,698,905 A | 12/1997 | Rüthlein et al. |
| 5,788,003 A | 8/1998 | Spiers |
| 5,841,266 A | 11/1998 | Hikita et al. |
| 5,848,659 A | 12/1998 | Karg et al. |
| 5,920,161 A | 7/1999 | Obara et al. |
| 5,994,881 A | 11/1999 | Miyazaki et al. |

(Continued)

FOREIGN PATENT DOCUMENTS

DE 101 63 841 7/2003

(Continued)

OTHER PUBLICATIONS

BAE Systems, Electronics & Integrated Solutions, "HybriDrive® Propulsion System for Army Medium Tactical Truck", 2005 Bae Systems, www.eis.na.baesystems.com/brochures/pdfs/fmtv.pdf.

(Continued)

*Primary Examiner*—Paul N Dickson
*Assistant Examiner*—John R Olszewski
(74) *Attorney, Agent, or Firm*—Finnegan, Henderson, Farabow, Garrett & Dunner

(57) ABSTRACT

A dual purpose mobile machine is disclosed. The mobile machine may have a power source configured to propel the mobile machine and generate electrical power for use off-board the mobile machine. The machine may also have a work tool driven by the power source.

18 Claims, 2 Drawing Sheets

U.S. PATENT DOCUMENTS

| | | |
|---|---|---|
| 6,107,691 A | 8/2000 | Gore et al. |
| 6,138,069 A | 10/2000 | Ellertson et al. |
| 6,157,175 A | 12/2000 | Morinigo et al. |
| 6,533,055 B2 | 3/2003 | Matsuura et al. |
| 6,649,289 B2 | 11/2003 | Hsu et al. |
| 6,705,030 B2 | 3/2004 | Tokunaga |
| 6,805,462 B1 * | 10/2004 | Smith et al. ............... 362/192 |
| 6,861,767 B2 | 3/2005 | Amano et al. |
| 6,885,920 B2 | 4/2005 | Yakes et al. |
| 6,979,977 B2 | 12/2005 | Amano et al. |
| 6,995,480 B2 | 2/2006 | Amano et al. |
| 7,025,158 B2 | 4/2006 | Kanzler et al. |
| 7,231,994 B2 * | 6/2007 | Buglione et al. ......... 180/65.31 |
| 7,248,152 B2 * | 7/2007 | Gilbert et al. ............. 340/428 |
| 7,276,815 B2 * | 10/2007 | Algrain et al. ............... 307/80 |
| 7,378,808 B2 * | 5/2008 | Kuras et al. ................ 318/139 |
| 2002/0153726 A1 | 10/2002 | Sumner |
| 2003/0037973 A1 | 2/2003 | Chernoff et al. |
| 2004/0159480 A1 | 8/2004 | Ishikawa et al. |
| 2004/0231315 A1 | 11/2004 | Gonzalez |
| 2005/0183623 A1 | 8/2005 | Gritsch |
| 2005/0197751 A1 | 9/2005 | Koike |
| 2005/0284676 A1 | 12/2005 | King et al. |
| 2006/0076172 A1 | 4/2006 | Fiorenza et al. |
| 2007/0175680 A1 | 8/2007 | Gouker |

FOREIGN PATENT DOCUMENTS

| | | |
|---|---|---|
| EP | 1 516 770 | 3/2005 |
| JP | 03271027 | 12/1991 |
| JP | 09200906 | 7/1997 |
| JP | 10051905 | 2/1998 |
| JP | 10117403 | 5/1998 |
| JP | 10337098 | 12/1998 |
| JP | 2000059915 | 2/2000 |
| JP | 2000299901 | 10/2000 |
| JP | 2004168149 | 6/2004 |
| WO | WO 9855335 | 12/1998 |

OTHER PUBLICATIONS

Oshkosh, News Release, Oshkosh Demonstrates ProPulse, the First Electric Hybrid-Drive Heavy Defense Truck, Wis., Feb. 27, 2002 (Business Wire), www.investors.oshkoshtruckcorporation.com/phoenix.zhtml?c=93403+p=irol-.

Oshkosh Truck Corporation, ProPulse Hybrid Electric Drive Technology (PPulse 10/03), http://www.oshkoshtruckcorporation.com/pdfs/Oshkosh_ProPulse_drive_brochure.pdf.

* cited by examiner

US 7,673,713 B2

MULTI-PURPOSE MOBILE POWER GENERATING MACHINE

TECHNICAL FIELD

The present application is directed to a mobile machine and, more particularly, to a mobile machine having multiple purposes, one of which includes power generation.

BACKGROUND

Machines such as, for example, track-type tractors, wheel loaders, haul trucks, and other heavy construction, agriculture, and mining equipment are used to perform many tasks such as, for example, digging, dozing, loading, tilling, hauling, power generation, and other similar duties. To effectively perform these tasks, each different machine requires a power source that provides significant power to a drivetrain arrangement and/or a tool arrangement. The power source may be a combustion engine such as, for example, a turbine engine, a diesel engine, a gasoline engine, or a gaseous fuel-powered engine operated to generate a torque output at a range of speeds. This torque output may be transmitted from the power source through a transmission to a ground engaging traction device such as wheels, tracks, tires, or belts that propel the machine. In addition, this torque output may be transmitted through a hydraulic pump or electric generator to a tool such as a bucket, blade, ripper, or dump bed.

Although the machines described above may be quite efficient in accomplishing their respective predetermined tasks, they may also be expensive and costly to transport. When a particular worksite has many different types of tasks, many different pieces of equipment are required at the worksite. The number of different pieces of equipment operating or sitting idle at the same worksite increases the operational cost of the worksite. In addition, transportation of each of the pieces of equipment to and from the worksite may be expensive, particularly when the worksite is remote from the current location of the machines. One way to reduce the operational cost of a remote worksite having a variety of different tasks may be to utilize a machine at the worksite for multiple purposes.

One multi-purpose machine is described in U.S. Pat. No. 6,649,289 (the '289 patent) issued to Hsu et al. on Nov. 18, 2003. Specifically, the '289 patent describes an electric car that is used for transportation as well as offboard power generation at a remote location. The electric car of the '289 patent has an onboard fuel cell that produces electrical power sufficient to propel the car. When the car is parked at the remote location, the fuel cell continues to operate and produce electrical power. The electric car is connected through power cables to an offboard utility grid to transmit a portion of the electrical power produced by the onboard fuel cell to the remote site. By utilizing the electric car for both transportation and stationary power generation, the initial cost of the car may be offset by the benefit associated with the stationary power generation. In addition, the cost of transporting a separate power generator to the remote site may be eliminated.

Although the multipurpose nature of the electric car described in the '289 patent may offset the initial cost of the car and some transportation costs associated with the remote location, its use and benefit may be limited. Specifically, because the fuel cell of the '289 patent is associated with an electric car, its use at a construction, agricultural, or mining related worksite may be minimal. That is, without a work tool, the car's only purpose at the worksite may be power generation and, because of its size and configuration, the amount of power and the output variability of the power provided by the car may be insufficient to support worksite operations.

The machine of the present disclosure solves one or more of the problems set forth above.

SUMMARY OF THE INVENTION

One aspect of the present disclosure is directed to a mobile machine. The mobile machine may include a power source configured to propel the mobile machine and generate electrical power for use offboard the mobile machine. The machine may also include a work tool driven by the power source.

Another aspect of the present disclosure is directed to another mobile machine. This mobile machine may include an internal combustion engine and a generator driven by the internal combustion engine to produce electrical power in the range of 100-2600 kW. The mobile machine may also include a traction device configured to propel the mobile machine, and a motor configured to receive electrical power from the generator and drive the traction device. The mobile machine may further include an interface electrically coupled to the generator to selectively make all of the electrical power from the generator available for use offboard the mobile machine.

Another aspect of the present disclosure is directed to a method of power management onboard a mobile machine. The method may include generating an electrical power output, and receiving an operating mode input. The method may further include directing all of the generated electrical power output through either an onboard power flow path or an offboard power flow path in response to the operating mode input.

DETAILED DESCRIPTION

Figure 1:
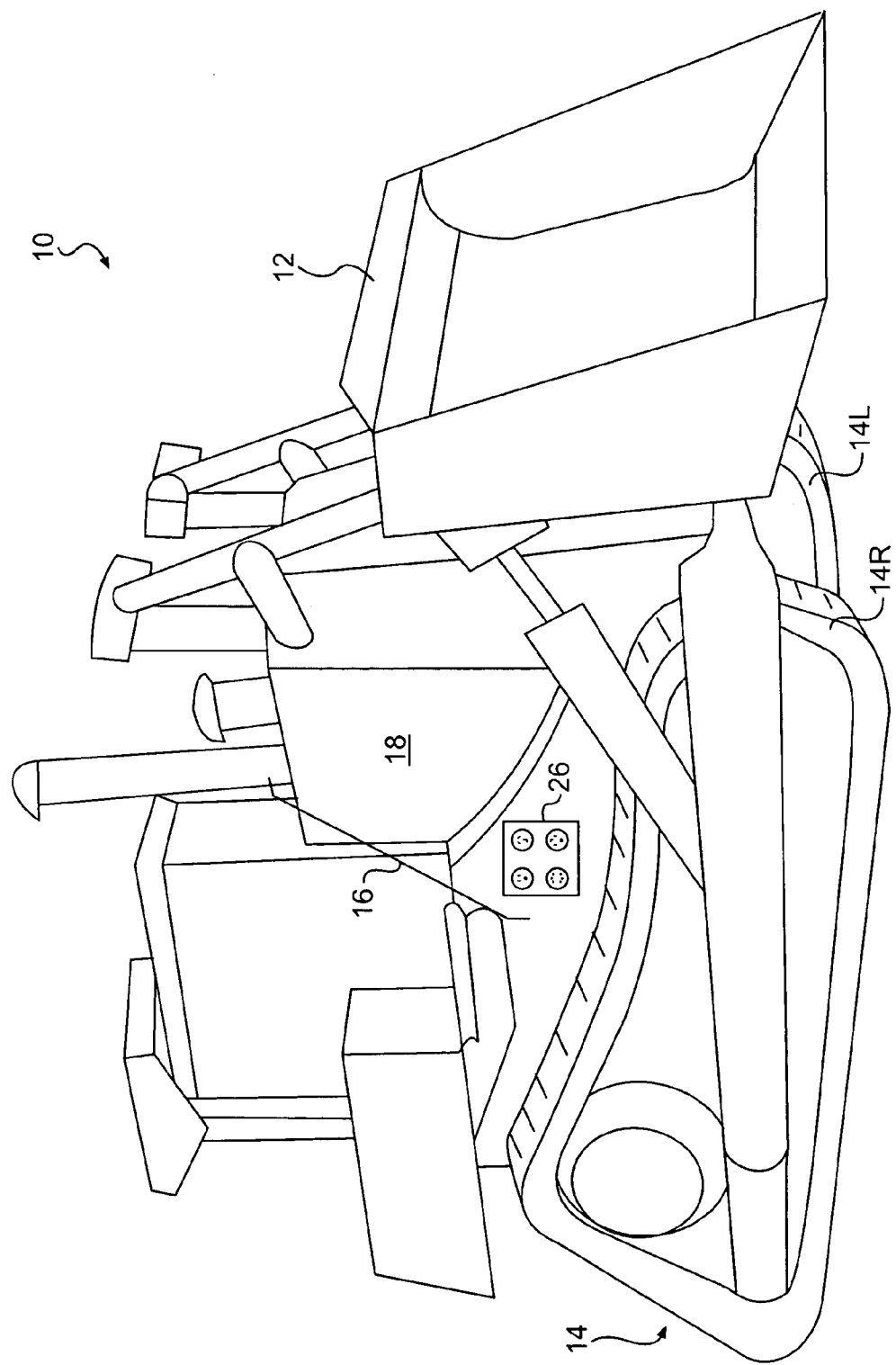
FIG. 1 is a diagrammatic illustration of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth moving machine such as the track-type tractor depicted in FIG. 1. Machine 10 may alternatively embody a non-earthmoving machine such as an on-highway truck, a passenger vehicle, or any other suitable operation-performing machine. Machine 10 may include a work tool 12, a traction device 14, and a power system 16 configured to transmit a power output to work tool 12 and traction device 14 in response to an operator input.

Numerous different work tools 12 may be attachable to a single machine 10 and controllable by an operator of machine 10. Work tool 12 may include any device used to perform a particular task associated with a surface or object offboard machine 10. For example, work tool 12 may embody a ripper, a bucket, a blade, or a shovel that engages a work surface; a fork arrangement utilized to manipulate an offboard object such as a pallet; a dump bed that supports and/or moves surface material loaded therein; a broom or a snow blower that prepares a work surface; a cutting device, a grasping device, or any other task-performing device known in the art. Many of these work tools may be hydraulically driven and all of them may be powered by system 16. Although connected in the disclosed embodiment forward of an operator station to lift and/or tilt relative to machine 10, work tool 12 may alternatively or additionally be connected rearward, above, below, or to the side of machine 10 to rotate, slide, swing, or move in any other manner known in the art.

Traction device 14 may include tracks 14L and 14R located on each side of machine 10. Alternatively, traction device 14 may include wheels, belts, or other driven traction devices. Traction device 14 may be driven by power system 16 to rotate in accordance with an output rotation of power system 16.

Figure 2:
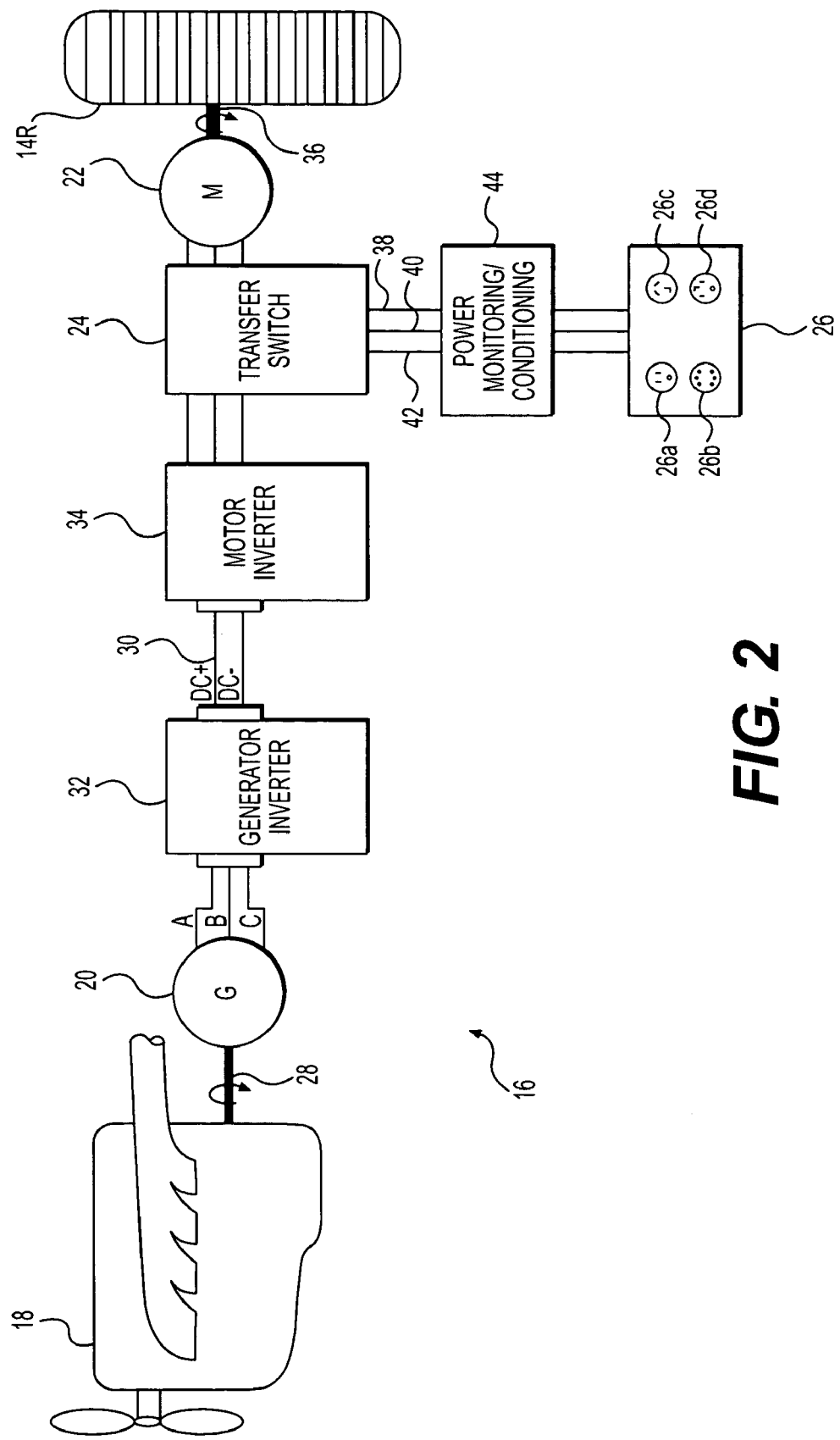
FIG. 2 is a schematic illustration of an exemplary disclosed power system for the machine of FIG. 1.

As illustrated in FIG. 2, power system 16 may include multiple components that cooperate to drive work tool 12 and produce an electrical output available both on and offboard machine 10. In particular, power system 16 may include a power source 18, a generator 20, a motor 22, a transfer switch 24 disposed between generator 20 and motor 22, and an offboard power interface 26.

Power source 18 may produce a mechanical power output and include, for example, a combustion engine. The combustion engine may be a diesel engine, a gasoline engine, a gaseous fuel-powered engine, a turbine engine, or any other type of combustion engine apparent to one skilled in the art, wherein a power output may be directly related to an amount of fuel combusted therein. It is also contemplated that power source 18 may alternatively embody a non-combustion source of power, if desired, such as a fuel cell, a battery, or any other source of power known in the art.

Generator 20 may be a three-phase permanent magnet alternating field-type generator configured to produce an alternating current (AC) output in response to a rotational input from power source 18. It is also contemplated that generator 20 may alternatively be a switched reluctance generator, a direct phase generator, or any other appropriate type of generator known in the art. Generator 20 may include a rotor (not shown) rotatably connected to power source 18 by any means known in the art such as, for example, by a direct crankshaft connection 28, via a gear train, through a hydraulic circuit, or in any other appropriate manner. Generator 20 may produce electrical power output as the rotor is rotated within a stator (not shown) by power source 18. Generator 20 may be electrically connected to a common bus 30 via a generator inverter 32, which may invert the three-phase alternating power to direct phase power.

Common bus 30 may include positive and negative power lines that electrically interconnect generator inverter 32 and motor 22 by way of a motor inverter 34. Common bus 30 may also be electrically connected to power storage devices such as batteries (not shown), capacitors (not shown), and other devices known in the art, and/or to accessory power loads to provide power to and remove power from common bus 30, if desired.

Motor 22 may be a permanent magnet alternating field-type motor configured to receive power from common bus 30 and to drive traction device 14R. It is contemplated that motor 22 may alternatively be a switched electric motor, a direct phase motor, or any other appropriate type of motor known in the art. It is also contemplated that motor 22 may supply power to common bus 30 during a power regeneration event (e.g., when gravity or momentum acting on track 14R drives motor 22). Although only a single motor 22 is illustrated in FIG. 2, it is contemplated that multiple motors 22 may be included within machine 10 in a series or parallel configuration. In addition, motor 22 may be connected to only traction device 14R or to both traction devices 14L and 14R through a direct connection 36 or through an indirection connection (not shown) such as a reducing gear arrangement, if desired.

Motor inverter 34 may invert the direct-phase power from generator inverter 32 to three-phase alternating power at a desired voltage and/or frequency as described below. In particular, motor inverter 34 may be configured to output power between 100-2600 kW and change the voltage thereof, for example, within the range of 120-480V, and within the range of 50-400 Hz. This voltage and/or frequency change may be instituted in response to an operational demand or an operator's request received via offboard power interface 26.

Transfer switch 24 may be communicatively connected to common bus 30 to selectively disrupt the power supply to motor 22. That is, in response to a mode selection made by an operator of machine 10, transfer switch 24 may direct all of the power from generator 20 to either motor 22 or to offboard power interface 26. The modes available for selection may include, for example, a mobile machine application mode or a stationary power generation mode.

Transfer switch 24 may embody a single microprocessor or multiple microprocessors that include a means for controlling the power supply of system 16. Numerous commercially available microprocessors can be configured to perform the functions of transfer switch 24. It should be appreciated that transfer switch 24 could readily embody a general machine or power source microprocessor capable of controlling numerous machine or power source functions. Transfer switch 24 may include all the components necessary to perform the required system control such as, for example, a memory, a secondary storage device, and a processor, such as a central processing unit. One skilled in the art will appreciate that transfer switch 24 can contain additional or different components. Associated with transfer switch 24 may be various other known circuits such as, for example, power supply circuitry, signal conditioning circuitry, and solenoid driver circuitry, among others.

It is contemplated that transfer switch 24 may alternatively be manually actuated, if desired. In one example, one or more power cables 38, 40, 42 may be manually connected to receive electrical power from generator 20, while motor 22 may be manually disconnected from common bus 30. In this situation, machine 10 may not have selectable modes of operation.

Offboard power interface 26 may provide access to onboard electrical power produced by generator 20. For example, offboard power interface 26 may include one or more different power outlets 26a, 26b, 26c, 26d. Each power outlet 26a-d may provide a different voltage and/or frequency output. Alternatively, a single or multiple similar outlets may be included within offboard power interface 26. In this situation, offboard power interface 26 may include a means for an operator to select or otherwise request a particular voltage and/or frequency of the power supply. In response to the engaged outlet, an offboard power demand, and/or the selected power supply characteristic(s), power source 18 and/or generator 20 may be operated to produce a corresponding amount of power, and motor inverter 34 may be operated to appropriately convert the produced power, as necessary. It is contemplated that, instead of or in addition to power outlets 26a-d, manual bolt down lugs may be provided, if desired.

A power monitoring and conditioning unit 44 may be disposed between transfer switch 24 and offboard power interface 26, if desired. Unit 44 may ensure that the power supplied offboard machine 10 substantially matches a demand and/or a selection made by an operator of machine 10.

INDUSTRIAL APPLICABILITY

While the drive system of the present disclosure has potential application in any mobile machine, the disclosed power system has particular applicability in track-type tractors and other heavy construction and mining machines that include a work tool. By combining multiple functions within a single machine, the operational cost of an associated worksite may be reduced. In addition, when one of the tasks required of the machine includes stationary power generation, the machines may be efficiently utilized, even while sitting stationary with or without an operator. Operation of machine 10 will now be described.

To propel machine 10, power from generator 20 may be selectively directed to motor 22 via generator and motor inverters 32 and 34. As motor 22 is urged to rotate, connected traction devices 14 may rotate correspondingly. The amount of power directed to motor 22 may determine the direction, travel speed, and/or drawbar pull of machine 10.

When mobile operation of machine 10 is no longer necessary such as during the night, between shifts, or when another process is underway, the power from generator 20 may be directed offboard machine 10. In particular, transfer switch 24 may be utilized to divert all of the power available from generator 20 away from motor 22 to offboard power interface 26. Depending on a selected power output or a power demand, generator 20 may be controlled to produce power in the range of, for example, 100-2600 kW at 120-480 V and at 50-400 Hz.

One exemplary application of machine 10 may include a pipe-laying operation. Specifically, in a pipe laying operation, a track type tractor is utilized to lay pipe within a previously dug trench. In a typical operation, after the tractor has laid the pipe into the trench, the tractor would normally sit idle waiting for the pipe to be welded to a previously laid pipe. To weld the pipes together, a separate stand-alone generator would typically be brought into place, started, and used to generate power directed to a welding machine. By requiring three separate machines to complete the pipe-laying process, the process is inefficiently costly. Instead, while the track type tractor is waiting for completion of the welding process, the power from generator 20 may be directed offboard to the welding machine. In this manner, the additional stand-alone generator may be omitted from the process, thereby greatly reducing the cost of the pipe-laying operation.

Another exemplary application may include a dozing operation such as the construction of an airstrip, where access to the location is difficult. In this scenario, a dozer transported to the remote site could perform the typical earth moving function during the day. At night, while an operator of the dozer rests, the dozer could then also function as the main power generator at the worksite. Because only a single machine must be transported to the remote worksite, costs associated therewith may be minimized. Further, because machine 10 includes a work tool, it may be especially beneficial at such a worksite.

In addition, because the amount of power and power output variability from machine 10 is so great, the application of machine 10 may be wide. In other words, because nearly all of the power from machine 10 (e.g., 100-2600 kW, depending on the model and size of machine 10) may be utilized offboard machine 10, machine 10 may essentially replace a typical power generator set found at a construction, mining, or agricultural worksite. Further, because the power from machine 10 flows through motor inverter 34, the power characteristics can be varied to accommodate most any worksite related application.

It will be apparent to those skilled in the art that various modifications and variations can be made in the disclosed multi-purpose machine without departing from the scope of the disclosure. Other embodiments of the disclosed multi-purpose machine will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. A mobile machine, comprising:
   a power source configured to propel the mobile machine and generate electrical power for use offboard the mobile machine, the power source including a transfer switch disposed between a generator and a motor, the transfer switch being operable to divert all electrical power produced by the generator away from the motor; and
   a work tool driven by the power source.

2. The mobile machine of claim 1, wherein the power source further includes an internal combustion engine.

3. The mobile machine of claim 2, wherein the power source further includes:
   a traction device;
   wherein the generator is driven by the internal combustion engine and the motor is electrically coupled to the generator and operatively mechanically coupled to the traction device.

4. The mobile machine of claim 3, wherein electrical power from the generator is directed only to either the motor or offboard the mobile machine.

5. The mobile machine of claim 1, further including a power converter disposed between the generator and the transfer switch, the power converter configured to modify the electrical power produced by the generator.

6. The mobile machine of claim 5, wherein the power converter is configured to output AC power at multiple voltages and frequencies.

7. The mobile machine of claim 1, further including an interface electrically coupled to the transfer switch, the interface having at least one power outlet.

8. The mobile machine of claim 7, further including a power conditioner disposed between the transfer switch and the interface.

9. The mobile machine of claim 1, wherein a speed of the power source is regulated in response to an electrical power demand offboard the mobile machine.

10. The mobile machine of claim 1, wherein the work tool is hydraulically powered.

11. The mobile machine of claim 1, wherein the work tool is a blade.

12. A mobile machine, comprising:
    an internal combustion engine;
    a generator driven by the internal combustion engine to produce electrical power in the range of 100-2600 kW;
    a traction device configured to propel the mobile machine;
    a motor configured to receive electrical power from the generator and drive the traction device;
    a transfer switch disposed between the generator and the motor, the transfer switch being operable to divert all electrical power produced by the generator away from the motor; and an interface electrically coupled to the generator to selectively make all of the electrical power from the generator available for use offboard the mobile machine.

13. The mobile machine of claim 12, further including a power converter disposed between the generator and the transfer switch, the power converter configured to covert DC power from the generator to AC power at multiple voltages and frequencies.

14. The mobile machine of claim 12, further including a power conditioner disposed between the transfer switch and the interface.

15. The mobile machine of claim 12, wherein a speed of the internal combustion engine is regulated in response to an electrical power demand offboard the mobile machine.

16. A method of power management onboard a mobile machine, comprising:
generating an electrical power output;
receiving an operating mode input; and
directing all of the generated electrical power output through either an onboard power flow path or an offboard power flow path in response to the operating mode input via a transfer switch disposed between a generator and a motor, the transfer switch being operable to divert all electrical power produced by the generator away from the motor.

17. The method of claim 16, further:
including receiving a power demand from offboard the mobile machine; and
modifying the power directed through the offboard power flow path in response to power demand.

18. The method of claim 17, wherein modifying includes changing a fuel combustion amount.

* * * * *